United States Patent [19]

Rich

[11] Patent Number: 5,171,083
[45] Date of Patent: Dec. 15, 1992

[54] COMBINED LUGGAGE RACK AND CONCEALED LIGHTS FOR VEHICLE ROOF

[75] Inventor: Lawrence D. Rich, New Baltimore, Mich.

[73] Assignee: LTC Roll & Engineering Co., Mt. Clemens, Mich.

[21] Appl. No.: 757,394

[22] Filed: Sep. 10, 1991

[51] Int. Cl.⁵ .............................................. B60Q 1/00
[52] U.S. Cl. ..................................... 362/73; 362/66; 362/74; 362/418; 362/427
[58] Field of Search ................... 362/61, 66, 73, 74, 362/80, 418, 419, 421, 427, 428

[56] References Cited

U.S. PATENT DOCUMENTS

| | | | |
|---|---|---|---|
| 3,375,365 | 3/1968 | Gross | 362/73 |
| 4,269,339 | 5/1981 | Bott | 362/73 |
| 4,426,028 | 1/1984 | Bott | 362/73 |
| 4,534,496 | 8/1985 | Bott | 362/73 |
| 4,707,014 | 11/1987 | Rich | 362/74 |
| 4,937,711 | 6/1990 | Shuen | 362/61 |

Primary Examiner—Ira S. Lazarus
Assistant Examiner—Sue Hagarman
Attorney, Agent, or Firm—Dykema Gossett

[57] ABSTRACT

The present invention discloses a unique lighting structure for use on vehicles, in which concealable lights are incorporated into a luggage rack on the roof of a vehicle. The lights rotate between concealed and use positions. In the concealed position a portion of the light housing is aligned with a portion of the luggage rack housing such that the luggage rack may be used normally. In the use position, a bulb faces longitudinally forwardly of the vehicle, and is positioned vertically above the remainder of the luggage rack such that a light is directed from the roof of the vehicle.

13 Claims, 2 Drawing Sheets

COMBINED LUGGAGE RACK AND CONCEALED LIGHTS FOR VEHICLE ROOF

BACKGROUND OF THE INVENTION

This invention relates to a combined luggage rack and concealable light for use on the roof of a vehicle.

Luggage racks are commonly known in the prior art, and positioned on the roofs of vehicles to allow storage of items while protecting the surface of the vehicles. Prior art luggage racks typically include two longitudinally spaced rack members which support items to be transported on the vehicle.

Roof-mountable lamps are also available for off-road use. Several states prohibit the use of such lamps for on-road use, and may even require that the lamps be covered when used on a highway. This is inconvenient since most off-road vehicles are also used for on-road purposes. Further, the lamps may be damaged or broken during on-road use.

In response to this problem the prior art has developed lights which are concealable within structure on the roof of a vehicle. One example of such a prior art system is disclosed in U.S. Pat. No. 4,707,014, in which a pair of lights are incorporated into a roof spoiler. A similar device is disclosed in U.S. Pat. No. 4,787,665. While these patented devices have proven successful in overcoming the limitations in the prior art, it is still desirable to improve the applications and locations where concealable lamps may be mounted. Further, it is desirable to simplify and improve the structure for moving the lamps between the concealed and use positions.

SUMMARY OF THE INVENTION

In a disclosed embodiment, a pair of concealed lights are positioned within a cross member on a forward luggage rack. A rear luggage rack is spaced longitudinally rearwardly from the forward luggage rack. The structure for concealing and controlling movement of the lights is mounted within the luggage rack housing. More preferably, the lights include a bulb received within a housing, and the housing is rotatable between a use position where the bulb faces longitudinally forwardly and a concealed position where the light is protected by a housing portion of the cross member.

In a most preferred embodiment of the present invention the forward luggage rack has a pair of laterally spaced side members which extend vertically from a vehicle roof. A laterally extending cross member connects the two side members. The lights are preferably received at laterally outward portions of the cross member. A motor for driving the lights between the use and concealed positions is preferably disposed in each side member and includes a first gear which meshes with a second gear on the light. Most preferably, an electrical contact plate extends through the roof of the vehicle and mates with a contact in the side member to supply power to the motor for moving the light.

The lights preferably rotate through approximately 180 degrees between the concealed and use positions. In the concealed position a light bulb faces a cross member rear wall. A forward light housing wall faces forwardly, and a top light housing wall faces vertically upwardly in this concealed position. The light housing top wall is preferably vertically aligned with a vertical top wall of the cross member, such that the light housing top wall may be used to support items on the luggage rack. When the light is rotated to the use position, the light rotates through 180 degrees such that the bulb faces longitudinally forwardly. The forward light housing wall, which previously faced longitudinally forwardly, now faces longitudinally rearwardly. The wall is positioned vertically above the cross member real wall and extends longitudinally rearwardly of that wall such that the cross member rear wall supports the light.

These and other features of the present invention can be best understood from the following specification and drawings of which the following is a brief description.

DETAILED DESCRIPTION OF A PREFERRED EMBODIMENT

Figure 1:
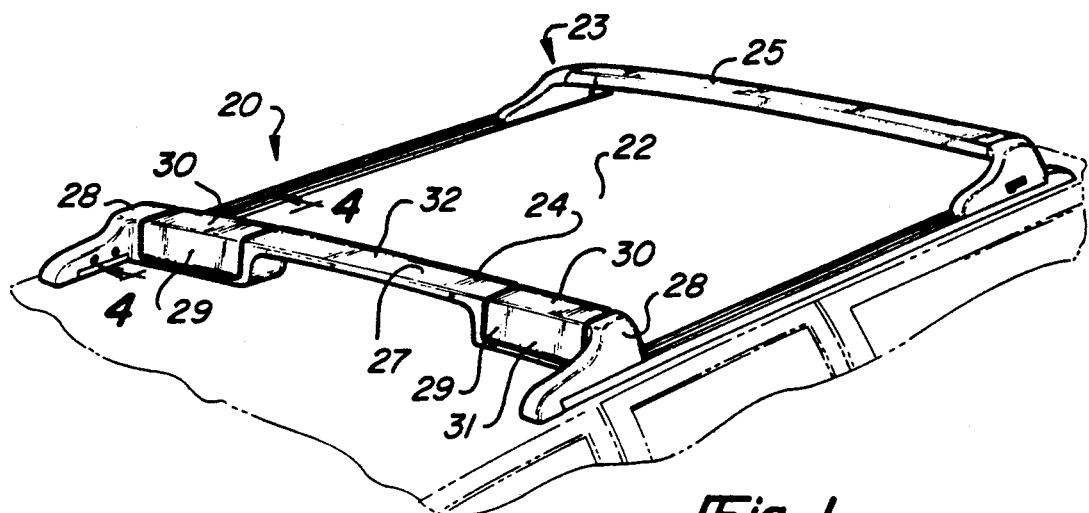
FIG. 1 is a perspective view of a vehicle incorporating the inventive luggage rack.

A vehicle 20 is illustrated in FIG. 1 and has a roof 22 which receives a luggage rack 23. Luggage rack 23 has a forward luggage rack 24, and a rear luggage rack 25. Forward luggage rack 24 has a laterally extending cross member 27 extending between lateral side portions 28. A pair of light sections 29 are received within cross member 27, and are shown in a concealed position. As will be explained below, a light bulb in each light section 29 is received within a housing compartment on cross member 27 when in the concealed position. Light sections 29 have a concealed top wall 30, and a concealed forward wall 31. Wall portions 30 and 31 conceal the bulb, as will be explained below. Wall portion 30 is aligned with a cross member top wall 32 which is generally parallel to roof 22. Items may be stored upon walls 30 and 32 when light sections 29 are in the concealed position. A tee-top may be disposed longitudinally forwardly of forward luggage rack 24.

Figure 2:
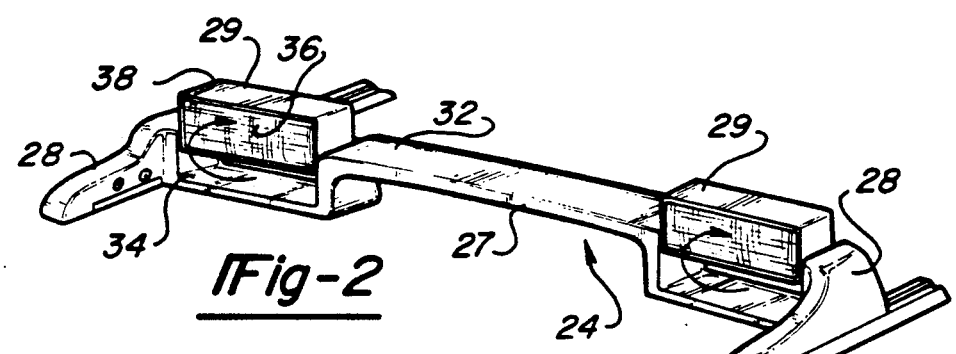
FIG. 2 is another perspective view of the luggage rack illustrated in FIG. 1.

As shown in FIG. 2, light portions 29 have pivoted to a use position. A bulb 36 faces forwardly of vehicle 20. Compartments 37 formed in cross member 27 mount light portions 29, and protect bulbs 36 when in the concealed position. When in the use position illustrated in FIG. 2, a use top wall 38 extends vertically above the cross member top wall 32. Thus, light is directed outwardly of bulbs 36 and forwardly of vehicle 20. Since bulbs 36 are spaced vertically above cross member top wall 32, the light is positioned above any expected obstructions on roof 22.

Figure 3:
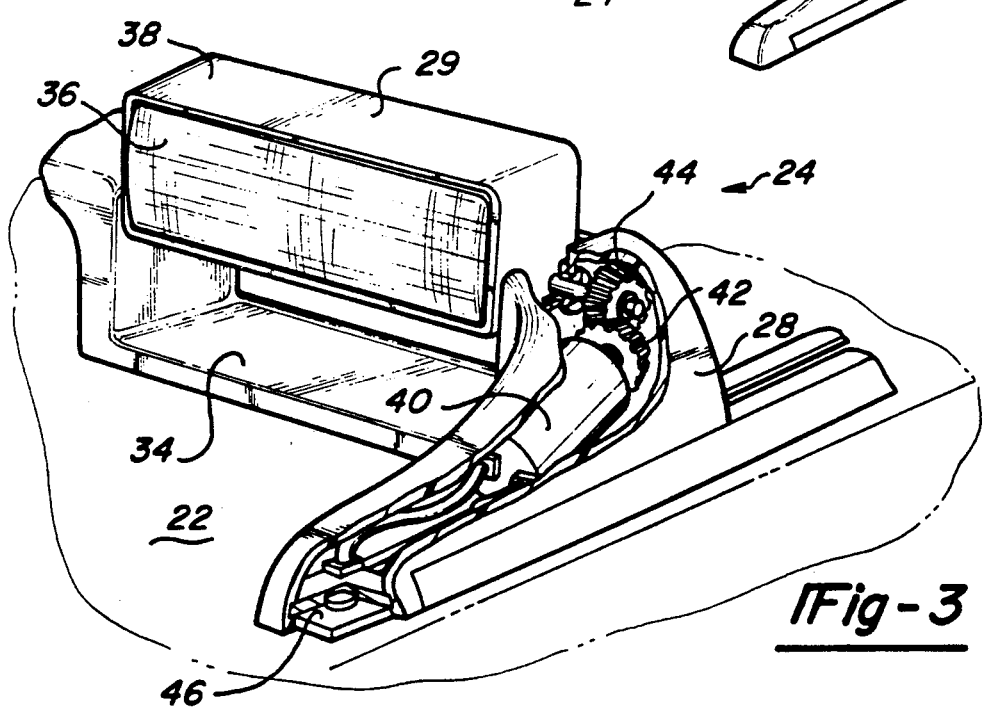
FIG. 3 is a partial perspective view, partially cut away, of the luggage rack illustrated in FIG. 1.

FIG. 3 is an enlarged view of light portion 29, and a motor 40 for moving light portion 29. As shown, side member 28 encloses motor 40, which drives a first gear 42. First gear 42 meshes with a second gear 44, which in turn drives light section 29. Motor 44 is reversible such that light portion 29 may be rotated to the use position shown, or to the concealed position as shown in FIG. 1. The illustrated gear sizes and types are not necessarily used. It is preferred that a relatively high speed motor be used, and that a gear reduction structure be used to reduce the speed from motor 40 to gear 44. Also, gears 42 and 44 may be replaced with a worm and bevel gear. Further, an electric supply structure 46 extends through roof 22 to supply power to motor 40, as will be explained below.

Figure 4:
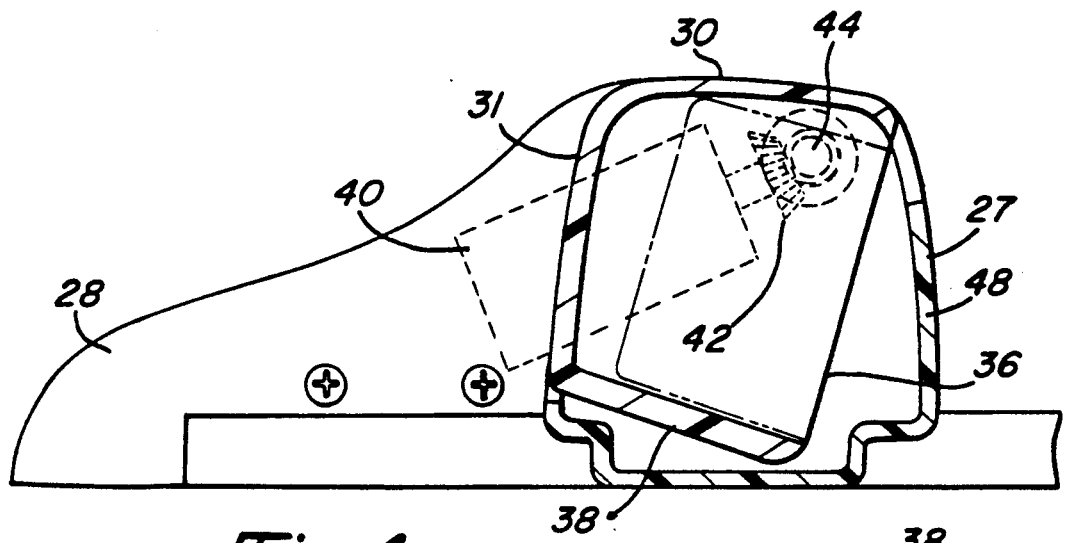
FIG. 4 is a cross-sectional view along line 4—4 as shown in FIG. 1.

As shown in FIG. 4, light section 29 is in the concealed position. Concealed top wall 30 faces vertically upwardly while concealed forward wall 31 faces longitudinally forwardly. Bulb 36 faces a rear wall 48 of compartment 34. As shown, gear 44, which is the axis of rotation of light portion 39, is positioned above a vertical center line and behind a longitudinal center line of light section 29. It should be understood that a shaft, not illustrated, from light section 29 preferably extends into the central portion of cross member 27 to rotatably support light section 29. That shaft will preferably be aligned with gear 44.

Figure 5:
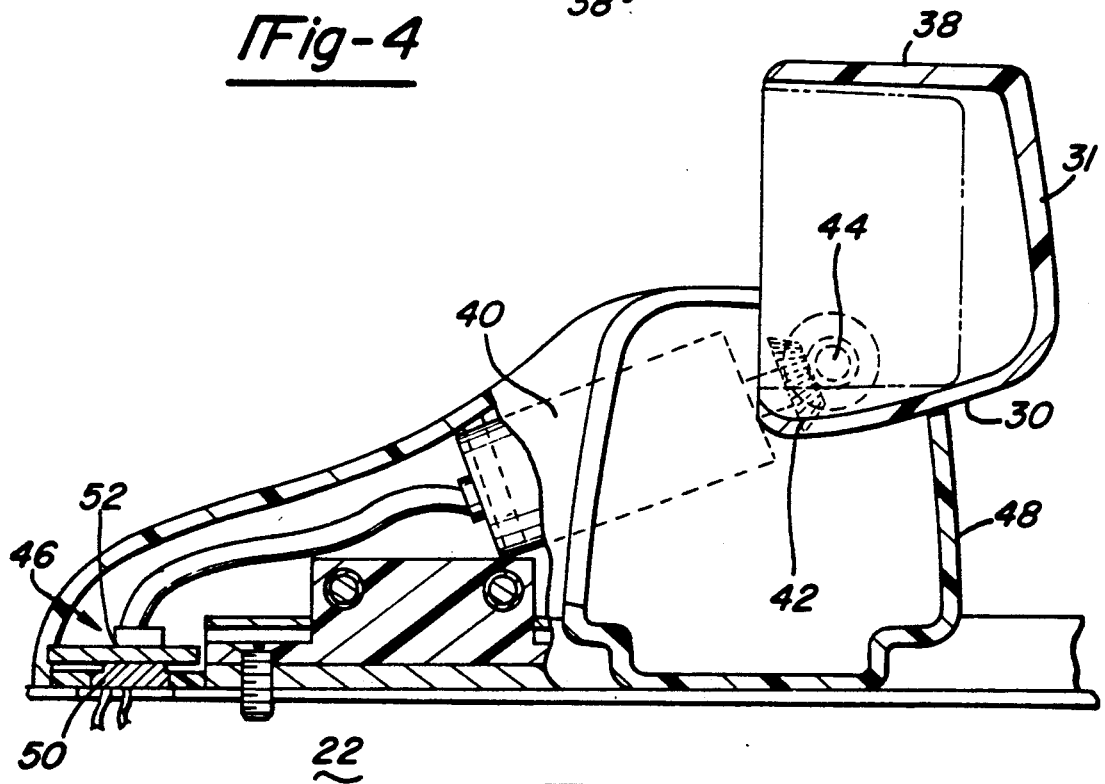
FIG. 5 is a view similar to FIG. 4.

As shown in FIG. 5, light portion 29 has now rotated approximately 180 degrees to a use position. Gear 44 is now below a vertical center line and longitudinally forwardly of longitudinal center line. As such, bulb 36 extends vertically above the vertical height of wall 32. Longitudinal forward wall 31 now faces longitudinally rearwardly. Wall 30 is supported above wall 48, and extends longitudinally rearwardly of wall 48. Wall 48 provides support to light section 29 when in the use position.

Electric supply 46 includes a first contact plate 50 extending through roof 22 of the vehicle. A second mating contact plate 52 is aligned with contact 50 and supplies power to motor 40. Further, some means of supplying power to bulbs 36 is required.

A preferred embodiment of the present invention has been disclosed, however, a worker of ordinary skill in the art would recognize that certain modifications would come within the scope of this invention. For that reason the following claims should be studied in order to determine the true scope and content of this invention.

I claim:

1. A luggage rack comprising:
    two side portions and a cross member extending between said two side portions; and
    a pair of lights, spaced laterally, and disposed within said cross member, said lights including a bulb received within a housing, said lights being movable between concealed and use positions with said bulb facing housing structure of said cross member in said concealed position, and said bulb facing outwardly of said cross member when in said use position.

2. A luggage rack as recited in claim 1, wherein said side members include a reversible motor to rotate said lights.

3. A luggage rack as recited in claim 2, wherein said motor drives a first gear, with said first gear meshing with a second gear, said second gear being fixed to rotate with said light.

4. A luggage rack as recited in claim 2, wherein said light housing being rotatable through a limited rotational extent within said first luggage rack between concealed and use positions, said bulb facing a housing portion of said first luggage rack when in said concealed position, and said light housing having a top wall facing vertically outwardly and a forward wall longitudinally forwardly of said first luggage rack when in said concealed position, such that said first luggage rack can be used to support items on said top wall when said light is in said concealed position, and said bulb is protected.

5. A luggage rack as recited in claim 4, wherein said first luggage rack includes a cross member extending laterally between two side members, said cross member having a central portion with a top wall at a first vertical location, and said top wall of said light housing being at said first vertical location when said light is in said concealed position, said cross member having compartments at each lateral end which rotatably receive said lights, said compartments having a longitudinally rear wall extending to a vertical distance below said first vertical position, said rear wall being said housing portion that said bulb faces in said concealed position.

6. A luggage rack as recited in claim 5, wherein said light being rotatable about an axis spaced vertically above and longitudinally rearwardly of center lines of said light in said concealed position, such that said light rotates to a position where it extends vertically above said first vertical distance, and said concealed forward wall of said light housing being spaced longitudinally rearwardly of said cross member rear wall when in said use position, and spaced slightly vertically above said cross member rear wall such that said cross member rear wall supports said light in said use position.

7. A luggage rack as recited in claim 1, wherein said lights rotate through approximately 180 degrees between said concealed and use positions.

8. A vehicle comprising:
    a roof having a first luggage rack positioned longitudinally forwardly of a second luggage rack; and
    a pair of lights positioned within said first luggage rack and rotatable between concealed and use positions, said lights each including a bulb received within a housing, said bulb being directed longitudinally forwardly of said vehicle when in said use position, and being rotated to face a different direction when in said concealed position.

9. A luggage rack as recited in claim 8, wherein said first luggage rack includes a cross member extending laterally between two side members, said cross member having a central portion with a top wall at a first vertical location, and a top wall of said light housing facing upwardly and being at said first vertical location when said light is in said concealed position, said cross member having compartments at each lateral end which rotatably receives said lights, said compartment having a longitudinally rear wall extending to a vertical distance below said first vertical position, said bulb facing said rear wall in said concealed position and a forward wall of said light housing facing longitudinally forwardly when said light is in said concealed position.

10. A luggage rack as recited in claim 9, wherein said light being rotatable about an axis which is spaced vertically above and longitudinally rearwardly of center lines of said light in said concealed position, and said light rotating to a, position where it extends vertically above said first vertical distance, said forward wall of said light housing being spaced longitudinally rearwardly of said cross member real wall when in said use position, and spaced vertically above said cross member real wall, such that said cross member real wall supports said light in said use position.

11. A luggage rack as recited in claim 10, wherein said lights rotate through approximately 180 degrees between said concealed and use positions.

12. A vehicle as recited in claim 8, wherein said first luggage rack structure includes two side pieces which extend vertically upwardly from said roof and a cross member extending laterally between said two side members, and there being means to rotate said lights disposed in said side members.

13. A vehicle as recited in claim 12, wherein said means to rotate said lights includes an electric motor received within said side members driving a first gear, said first gear meshing with a second gear which is fixed to said light members, such that upon rotation of said motor said first gear causes said second gear to rotate which in turn rotates said lights.

* * * * *